US010352230B2

(12) United States Patent
Kimura et al.

(10) Patent No.: US 10,352,230 B2
(45) Date of Patent: Jul. 16, 2019

(54) COOLING CONTROL SYSTEM FOR INTERNAL COMBUSTION ENGINE

(71) Applicant: HONDA MOTOR CO., LTD., Tokyo (JP)

(72) Inventors: Noritaka Kimura, Wako (JP); Kosuke Ihara, Wako (JP); Yosuke Yamada, Wako (JP); Yoshikazu Tanaka, Wako (JP); Hajime Uto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 15/548,582

(22) PCT Filed: Jan. 7, 2016

(86) PCT No.: PCT/JP2016/050352
§ 371 (c)(1),
(2) Date: Aug. 3, 2017

(87) PCT Pub. No.: WO2016/125525
PCT Pub. Date: Aug. 11, 2016

(65) Prior Publication Data
US 2018/0023457 A1    Jan. 25, 2018

(30) Foreign Application Priority Data
Feb. 6, 2015 (JP) ................................ 2015-022615

(51) Int. Cl.
*F02B 29/04*    (2006.01)
*F02M 26/05*    (2016.01)
(Continued)

(52) U.S. Cl.
CPC ............ *F02B 29/0493* (2013.01); *F01P 3/20* (2013.01); *F02B 29/0443* (2013.01);
(Continued)

(58) Field of Classification Search
CPC ............ F01P 2007/146; F01P 2025/50; F01P 2060/02; F01P 2060/04; F01P 2060/14;
(Continued)

(56) References Cited

U.S. PATENT DOCUMENTS 5,076,248 A * 12/1991 Schatz ...................... F01P 3/20
123/556
5,910,099 A *  6/1999 Jordan, Jr. .............. F01P 7/165
123/41.29
(Continued)

FOREIGN PATENT DOCUMENTS

JP        57-81437 U      5/1982
JP     2011-523691 A      8/2011
(Continued)

OTHER PUBLICATIONS

International Search Report dated Mar. 1, 2016, issued in counterpart International Application No. PCT/JP2016/050352 (2 pages).

*Primary Examiner* — Jesse S Bogue
(74) *Attorney, Agent, or Firm* — Westerman, Hattori, Daniels & Adrian, LLP

(57) ABSTRACT

Out of connection passages connecting the engine cooling circuit and the intercooler cooling circuit, a coolant inflow passage is connected between downstream of a mechanical pump and also upstream of a main radiator of the engine cooling circuit, and downstream of a sub radiator and also upstream of an electric pump of the intercooler cooling circuit, and a coolant outflow passage is connected between downstream of the electric pump and also upstream of the sub radiator of the intercooler cooling circuit, and downstream of the mechanical pump and also upstream of the main radiator of the engine cooling circuit. An inter-cooling circuit valve is provided in the coolant inflow passage.

18 Claims, 9 Drawing Sheets

(51) Int. Cl.
*F02M 26/21* (2016.01)
*F01P 3/20* (2006.01)
*F02M 35/10* (2006.01)
*F02M 31/04* (2006.01)
*F02M 31/10* (2006.01)
*F02M 26/06* (2016.01)
*F01P 7/14* (2006.01)

(52) U.S. Cl.
CPC ............ *F02M 26/05* (2016.02); *F02M 26/06* (2016.02); *F02M 26/21* (2016.02); *F02M 31/042* (2013.01); *F02M 31/102* (2013.01); *F02M 35/10222* (2013.01); *F01P 2007/146* (2013.01); *F01P 2025/50* (2013.01); *F01P 2060/02* (2013.01); *F01P 2060/04* (2013.01); *F01P 2060/14* (2013.01); *Y02T 10/126* (2013.01); *Y02T 10/146* (2013.01)

(58) Field of Classification Search
CPC ..... F01P 3/20; F02B 29/0443; F02B 29/0493; F02M 26/05; F02M 26/06; F02M 26/21; F02M 31/042; F02M 31/102; F02M 35/10222; Y02T 10/126; Y02T 10/146
See application file for complete search history.

(56) References Cited

U.S. PATENT DOCUMENTS

| 6,006,731 | A  | * | 12/1999 | Uzkan ..................... F01P 7/165 |
| | | | | 123/41.29 |
| 9,016,059 | B2 | * | 4/2015 | Lauberts ............. F02B 29/0412 |
| | | | | 60/599 |
| 9,097,174 | B2 | * | 8/2015 | Sellnau ..................... F01P 3/20 |
| 9,790,841 | B2 | * | 10/2017 | Lee ............................ F01P 7/16 |
| 2009/0020079 | A1 | * | 1/2009 | Muller .................... F01P 7/165 |
| | | | | 123/41.1 |
| 2015/0129161 | A1 | * | 5/2015 | Nishikawa ............. B60K 11/02 |
| | | | | 165/43 |
| 2015/0369179 | A1 | * | 12/2015 | Hotta .................. F02D 41/0065 |
| | | | | 123/568.12 |
| 2016/0326943 | A1 | * | 11/2016 | Kimura ..................... F01P 7/167 |
| 2018/0163607 | A1 | * | 6/2018 | Uto ........................ B60K 11/02 |
| 2018/0334951 | A1 | * | 11/2018 | Uto ......................... F02B 29/04 |

FOREIGN PATENT DOCUMENTS

JP 2012-219687 A 11/2012
JP 2014-156804 A 8/2014

* cited by examiner (a)

(b)

(a)

(b)

COOLING CONTROL SYSTEM FOR INTERNAL COMBUSTION ENGINE

TECHNICAL FIELD

The present invention relates to a cooling control system for an internal combustion engine that includes a supercharger, the cooling control system being provided for cooling intake gases which have been increased in temperature by being pressurized by the supercharger.

BACKGROUND ART

In general, in an internal combustion engine equipped with a supercharger, a cooling control system including an intercooler cools intake air which has been increased in temperature by being pressurized by the supercharger, in order to avoid occurrence of knocking or the like while ensuring improvement of power output. Conventionally, as such a cooling control system, there has been known one disclosed e.g. in PTL 1. This cooling control system includes an engine cooling circuit which is provided for mainly cooling a body of the engine (hereinafter referred to as the "engine main unit") and through which flows relatively high temperature coolant (hereinafter referred to as the "high-temperature system coolant"), and an intercooler cooling circuit which is provided for mainly cooling an intercooler and through which flows relatively low temperature coolant (hereinafter referred to as the "low-temperature system coolant").

The engine cooling circuit includes the above-mentioned engine main unit, a high-temperature system radiator, and a coolant passage connecting the engine main unit and the high-temperature system radiator, and is configured such that the high-temperature system coolant is delivered by a pump of a mechanical type (hereinafter referred to as the "mechanical pump") driven by the engine main unit, and is thereby caused to circulate through the engine cooling circuit. On the other hand, the intercooler cooling circuit includes the intercooler, a low-temperature system radiator, and a coolant passage connecting the intercooler and the low-temperature system radiator, and is configured such that the low-temperature system coolant is delivered by a pump of an electric type (hereinafter referred to as the "electric pump"), and is thereby caused to circulate through the intercooler cooling circuit.

Further, the respective coolant passages of the above engine cooling circuit and intercooler cooling circuit are connected to each other at two locations, and the connection passages of them are each provided with an openable and closable valve capable of controlling the degree of opening thereof. More specifically, a first connection passage is connected between downstream of the mechanical pump and the engine main unit and also upstream of the high-temperature system radiator of the engine cooling circuit, and downstream of the low-temperature system radiator and also upstream of the electric pump of the intercooler cooling circuit, and the first connection passage is provided with a first valve. Further, a second connection passage is connected between downstream of the high-temperature system radiator and also upstream of the mechanical pump of the engine cooling circuit, and downstream of the electric pump and the intercooler and also upstream of the low-temperature system radiator of the intercooler cooling circuit, and the second connection passage is provided with a second valve.

Further, the above-mentioned engine is equipped with an EGR device for recirculating part of exhaust gases discharged into an exhaust passage (hereinafter referred to as the "EGR gases") to an upstream side of a compressor of the supercharger in the intake passage. Therefore, when EGR is being performed, the intake air and the EGR gases (hereinafter, collectively referred to as the "intake gases") are cooled via the intercooler after being raised in temperature by the compressor of the supercharger, and are introduced into cylinders of the engine in a state lowered in temperature.

The EGR gases usually includes a relatively large amount of water vapor, and hence if the intake gases are excessively cooled by the intercooler, the water vapor in the intake gases is condensed when the intake gases pass though the intercooler, whereby condensed water is sometimes generated in the intake passage. If such condensed water is attached to components of an intake system including the intercooler, the components can be corroded. To avoid this problem, in the above-described cooling control system, the temperature of the intake gases at an outlet of the intercooler (hereinafter referred to as the "outlet temperature"), that is, the temperature of the intake gases cooled by the intercooler is compared with the dew-point temperature at that time, and the outlet temperature is controlled such that it becomes higher than the dew-point temperature.

More specifically, when the outlet temperature is higher than the dew-point temperature, the electric pump is operated with each of the first and second valves in a closed state to cause the low-temperature system coolant to circulate through the intercooler cooling circuit, whereby the temperature of the intake gases is lowered. On the other hand, when the outlet temperature is not higher than the dew-point temperature, the electric pump is stopped, and in addition, the high-temperature system coolant in the engine cooling circuit is caused to flow into the intercooler circuit by opening the first and second valves, whereby the temperature of the low-temperature system coolant is raised. Through this operation, the outlet temperature is made higher than the dew-point temperature, to thereby suppress condensed water from being generated when intake gases are cooled by the intercooler.

CITATION LIST

Patent Literature

[PTL 1] Japanese Laid-Open Patent Publication (Kokai) No. 2014-156804

SUMMARY OF INVENTION

Technical Problem

In general, in a cooling circuit, in a case where components, such as the above-mentioned intercooler and engine main unit, which should be cooled, and a radiator that performs heat exchange with the outside air are connected by a coolant passage, and coolant in the cooling circuit is caused to circulate using a pump provided in an intermediate portion of the coolant passage, the pressure of coolant downstream of the pump and also upstream of the radiator becomes much higher than the pressure of coolant upstream of the pump and also downstream of the radiator, due to a discharge force of the pump and pressure loss of the radiator. Therefore, in the above-described cooling control system, in a case where the high-temperature system coolant is caused to flow into the intercooler cooling circuit from the engine cooling circuit, and the low-temperature system coolant is caused to flow out of the intercooler cooling circuit into the engine cooling circuit, a difference between the pressure of coolant with the first valve of the first connection passage as a boundary and the pressure of coolant with the second valve of the second connection passage as a boundary becomes large.

More specifically, in the first connection passage, the pressure of the high-temperature system coolant is high since the upstream side of the first valve is the downstream side of the mechanical pump (the upstream side of the high-temperature system radiator), and on the other hand, the pressure of the low-temperature system coolant is low since the downstream side of the first valve is the upstream side of the electric pump (the downstream side of the low-temperature system radiator). Further, in the second connection passage, the pressure of the low-temperature system coolant is high since the upstream side of the second valve is the downstream side of the electric pump (the upstream side of the low-temperature system radiator), and on the other hand, the pressure of the high-temperature system coolant is low since the downstream side of the second valve is the upstream side of the mechanical pump (the downstream side of the high-temperature system radiator).

As described above, in the first and second connection passages, the pressure differences of coolant between upstream and downstream of the respective first and second valves are both large. Particularly, since the upstream and downstream sides of the second valve in the second connection passage correspond to the upstream side of the low-temperature system radiator and the downstream side of the high-temperature system radiator, in addition to the pressure difference of coolant with the second valve as the boundary, the pressure difference of coolant between the first and second valves becomes very large. Further, as the engine speed becomes higher, the amount of the high-temperature system coolant delivered by the mechanical pump becomes larger, so that the above-mentioned pressure differences become even larger. For this reason, to properly control coolant flowing through the intercooler of the intercooler cooling circuit, it is required to finely control the degrees of opening of the first and second valves between a fully-closed state and a fully-open state. Valves capable of performing such opening control are generally relatively expensive, and hence the manufacturing costs of the whole cooling control system are increased.

Further, when the above-mentioned pressure differences are very large, it is required to reduce the degrees of opening of the first and second valves to minimize the same. In this case, however, in case foreign matter, such as dust, is included in the coolant, the foreign matter sometimes blocks the openings of the valves, which can make it impossible to cause the coolant to properly flow in and out between the engine cooling circuit and the intercooler cooling circuit.

The present invention has been made to provide a solution to the above-described problems, and an object thereof is to provide a cooling control system for an internal combustion engine, which is capable of ensuring cooling of intake gases and suppression of generation of condensed water, and reducing a pressure difference of coolant between an engine cooling circuit and an intercooler cooling circuit, whereby even when the degree of opening of a valve provided between the two cooling circuits is made larger, it is possible to cause the coolant to properly flow from one to the other of the two cooling circuits.

Solution to Problem

To attain the above object, the invention according to claim 1 is a cooling control system 1 for an internal combustion engine 3 that includes a supercharger (turbocharger 11 in the embodiment (hereinafter, the same applies throughout this section)), the cooling control system 1 being provided for cooling intake gases which have been increased in temperature by being pressurized by the supercharger, comprising an engine cooling circuit 50 that includes an engine main unit 3b, a first radiator (main radiator 51), a first coolant passage (engine coolant passage 52) connecting between the engine main unit and the first radiator, for causing coolant to circulate therebetween, and a first pump (mechanical pump 53) provided in the first coolant passage, for delivering the coolant to thereby cause the coolant to circulate, an intercooler cooling circuit 60 that includes an intercooler 34 for cooling the intake gases, a second radiator (sub radiator 61), a second coolant passage (intercooler coolant passage 62) connecting between the intercooler and the second radiator, for causing coolant to circulate therebetween, and a second pump (electric pump 63) provided in the second coolant passage, for delivering the coolant to thereby cause the coolant to circulate, and a plurality of connection passages connecting the first coolant passage and the second coolant passage, for causing the coolant to flow from one to the other of the engine cooling circuit and the intercooler cooling circuit, wherein the plurality of connection passages include a coolant inflow passage 71 that is connected between downstream of the first pump and also upstream of the first radiator of the engine cooling circuit, and downstream of the second radiator and also upstream of the second pump of the intercooler cooling circuit, for causing the coolant in the engine cooling circuit to flow into the intercooler cooling circuit, and a coolant outflow passage 72 that is connected between downstream of the second pump and also upstream of the second radiator of the intercooler cooling circuit, and downstream of the first pump and also upstream of the first radiator of the engine cooling circuit, for causing the coolant in the intercooler cooling circuit to flow out into the engine cooling circuit, the cooling control system further comprising a valve (inter-cooling circuit valve 73) that is openably and closably provided in the coolant inflow passage, for being opened when the coolant in the engine cooling circuit is caused to flow into the intercooler cooling circuit.

With this arrangement, the engine cooling circuit is formed by the engine main unit, the first radiator, the first coolant passage, and the first pump, while the intercooler cooling circuit is formed by the intercooler, the second radiator, the second coolant passage, and the second pump. In the engine cooling circuit, the engine main unit performing a burning operation is cooled, and hence the temperature of coolant flowing through the engine cooling circuit becomes relatively high, while in the intercooler cooling circuit, the intake gases are cooled, and hence the temperature of coolant flowing through the intercooler cooling circuit becomes lower than the temperature of the coolant flowing through the engine cooling circuit. In the intercooler cooling circuit configured as described above, by causing the coolant having a relatively low temperature to circulate, it is possible to properly cool the intake gases which have been increased in temperature by being pressurized by the supercharger. Note that in the following description, the coolant flowing through the engine cooling circuit is referred to as the "high-temperature system coolant", and the coolant flowing through the intercooler cooling circuit is referred to as the "low-temperature system coolant", as deemed appropriate.

In the above-described engine cooling circuit and intercooler cooling circuit, the coolant can be caused to flow from one to the other of the cooling circuits via the plurality of connection passages that connect the cooling circuits. Specifically, the valve of the coolant inflow passage is opened, whereby part of the high-temperature system coolant circulating through the engine cooling circuit flows into the intercooler cooling circuit via the coolant inflow passage, and part of the low-temperature system coolant circulating through the intercooler cooling circuit flows out into the engine cooling circuit via the coolant outflow passage. With this, the high-temperature system coolant from the engine cooling circuit is mixed into the low-temperature system coolant in the intercooler cooling circuit, so that it is possible to raise the temperature of the low-temperature system coolant, whereby it is possible to prevent intake gases cooled by the intercooler from being excessively cooled, thereby making it possible to suppress generation of condensed water.

Further, the coolant inflow passage of the connection passages connects between downstream of the first pump and also upstream of the first radiator of the engine cooling circuit, and downstream of the second radiator and also upstream of the second pump of the intercooler cooling circuit, while the coolant outflow passage connects between downstream of the second pump and also upstream of the second radiator of the intercooler cooling circuit, and downstream of the first pump and also upstream of the first radiator of the engine cooling circuit. That is, in the engine cooling circuit, a position where the high-temperature system coolant flows out into the intercooler cooling circuit, and a position where the low-temperature system coolant flows in from the intercooler cooling circuit are both commonly located downstream of the first pump and also upstream of the first radiator. For this reason, in a case where the coolant is caused to flow between the engine cooling circuit and the intercooler cooling circuit, it is possible to make the pressure difference of the coolant flowing between the cooling circuits much smaller than the prior art. As described above, the pressure difference of the coolant flowing between the two cooling circuits can be suppressed, and hence even if the degree of opening of the valve provided in the coolant inflow passage is increased, it is possible to cause the coolant to properly flow from one to the other of the two cooling circuits.

The invention according to claim 2 is the cooling control system according to claim 1, further comprising valve control means (ECU 2) for controlling the valve, and wherein the valve control means controls the valve to one of a fully-open state and a fully-closed state.

With this arrangement, the valve provided in the coolant inflow passage is controlled by the valve control means to one of the fully-open state and the fully-closed state, and hence it is possible to employ, as the valve, a relatively simple and inexpensive valve which is opened and closed e.g. by an ON/OFF control signal. With this, compared with a case where a valve of which the degree of opening can be finely controlled is employed, it is possible to reduce the manufacturing costs of the cooling control system.

The invention according to claim 3 is the cooling control system according to claim 2, wherein in the second coolant passage of the intercooler cooling circuit, a coolant sensor (low-temperature system coolant temperature sensor 65) for detecting a temperature of coolant flowing through the second coolant passage is provided at a location downstream of a connecting portion of the second coolant passage to the coolant inflow passage and also upstream of the intercooler, and wherein the valve control means controls the valve according to the temperature of the coolant detected by the coolant sensor (low-temperature system coolant temperature TWLo).

With this arrangement, the temperature of the coolant at the location downstream of the connecting portion of the second coolant passage of the intercooler cooling circuit to the coolant inflow passage and also upstream of the intercooler is detected by the above-described coolant sensor. When the valve is in the fully-closed state, the detected temperature is the temperature of the low-temperature system coolant immediately before the low-temperature system coolant flows into the intercooler after circulation through the intercooler cooling circuit. Further, when the valve is in the fully-open state, the detected temperature is the temperature of the low-temperature system coolant immediately before the low-temperature system coolant flows into the intercooler after the high-temperature system coolant, which has flowed from the engine cooling circuit into the intercooler cooling circuit via the coolant inflow passage, is mixed into the low-temperature system coolant. As described above, by accurately detecting the temperature of the low-temperature system coolant immediately before the low-temperature system coolant flows into the intercooler, it is possible to properly control the opening and closing of the valve and so forth, according to a result of the detection.

The invention according to claim 4 is the cooling control system according to any one of claims 1 to 3, wherein in the second coolant passage of the intercooler cooling circuit, a chamber 64 having a transverse cross section larger than that of the second coolant passage is provided at a location downstream of a connecting portion of the second coolant passage to the coolant inflow passage and also upstream of the intercooler.

With this arrangement, the above-described chamber is provided at a location downstream of the connecting portion of the second coolant passage to the coolant inflow passage and also upstream of the intercooler, and hence even when the high-temperature system coolant within the engine cooling circuit flows into the intercooler cooling circuit or when the inflow thereof is stopped, along with opening or closing of the valve, it is possible to suppress hunting of a change in the temperature of the low-temperature system coolant flowing into the intercooler. With this, in the case where the opening and closing of the valve or the like is controlled according to the temperature of the low-temperature system coolant flowing into the intercooler, it is possible to properly and stably perform the control.

The invention according to claim 5 is the cooling control system according to any one of claims 1 to 4, wherein the engine further includes an EGR device 12 for recirculating part of exhaust gases discharged into an exhaust passage 5 of the engine to an upstream side of a compressor 21 of the supercharger in an intake passage 4 of the engine, via an EGR passage 41, and wherein the intake passage has an intake passage heating portion 91 provided in a surrounding of a connecting portion of the intake passage to the EGR passage, for causing the coolant in the intercooler cooling circuit to flow between an inner wall and an outer wall of the intake passage, to thereby heat the inner wall.

With this arrangement, EGR gases as the part of the exhaust gases discharged into the exhaust passage of the engine are recirculated to the intake passage of the engine, more specifically, to the upstream side of the compressor of the supercharger, via the EGR passage of the EGR device. Further, the intake passage has the above-described intake passage heating portion provided in the surrounding of the connecting portion of the intake passage to the EGR passage. In the intake passage heating portion, the coolant within the intercooler cooling circuit can flow between the inner wall and the outer wall of the intake passage, and the inner wall of the intake passage is heated by the coolant flowing through the intake passage heating portion. With this, for example, even in a case where the outside air temperature is low e.g. in winter, it is possible, by heating the inner wall of the intake passage, to prevent condensed water from being generated e.g. when EGR gases are in contact with the inner wall. Therefore, even in the case where the outside air temperature is low, the EGR can be performed, and as a consequence, it is possible to improve fuel economy of the engine while reducing the amount of NOx generated in exhaust gases.

The invention according to claim 6 is the cooling control system according to claim 5, wherein the inner wall is provided with a plurality of fins 92a protruding toward an inside of the intake passage.

With this arrangement, since the plurality of fins protruding toward the inside of the intake passage are provided on the inner wall of the intake passage of the intake passage heating portion, it is possible to increase a contact area of the inner wall of the intake passage with EGR gases. This makes it possible to efficiently heat the inner wall of the intake passage of the intake passage heating portion, and more effectively suppress generation of condensed water in the surrounding of the connecting portion of the intake passage to the EGR passage.

BRIEF DESCRIPTION OF DRAWINGS

FIG. 4 A diagram useful in explaining the flow of coolant in the engine cooling circuit and the intercooler cooling circuit, in which FIG. 4(a) shows the flow of the coolant in a case where an inter-cooling circuit valve is in a fully-closed state, and FIG. 4(b) shows the flow of the coolant in a case where the inter-cooling circuit valve is in a fully-open state.

FIG. 9 Diagrams of a pressure distribution of coolant in the engine cooling circuit and the intercooler cooling circuit, in which FIG. 9(a) is an overall diagram of the pressure distribution in the two cooling circuits, and FIG. 9(b) is an enlarged diagram of a portion of FIG. 9(a) encircled by a one-dot chain line, which is illustrated in a vertically scaled-up state.

DESCRIPTION OF EMBODIMENTS

Figure 1:
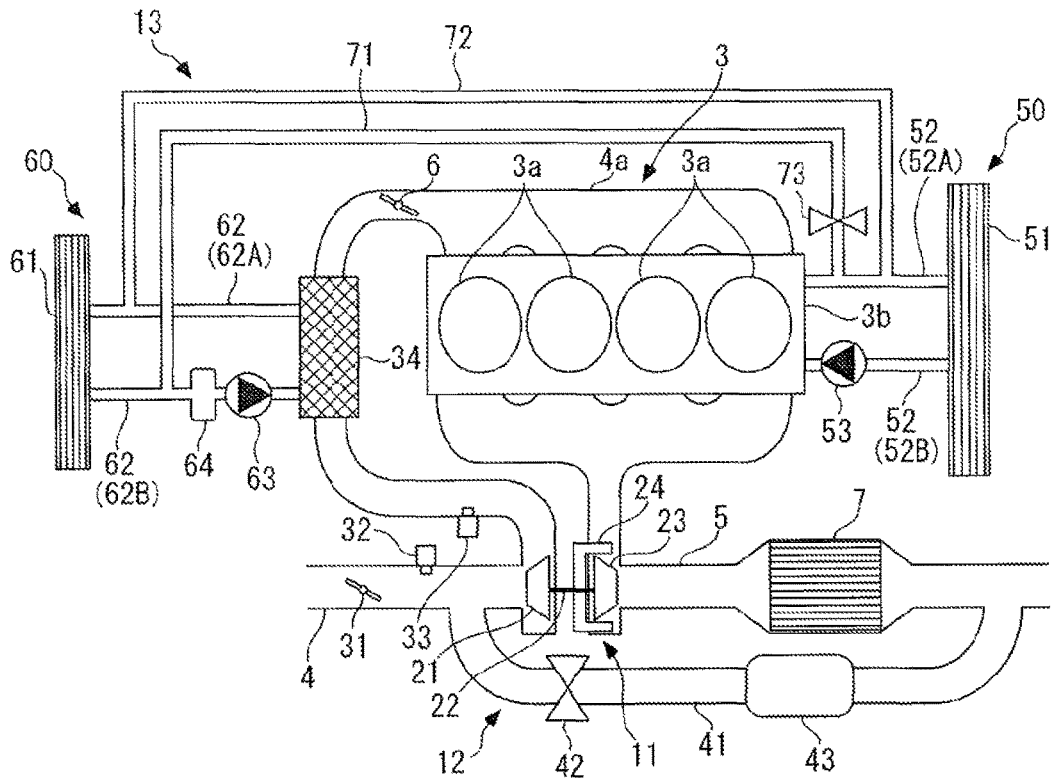
FIG. 1 A schematic diagram of an internal combustion engine to which is applied a cooling control system according to an embodiment of the present invention.
Figure 2:
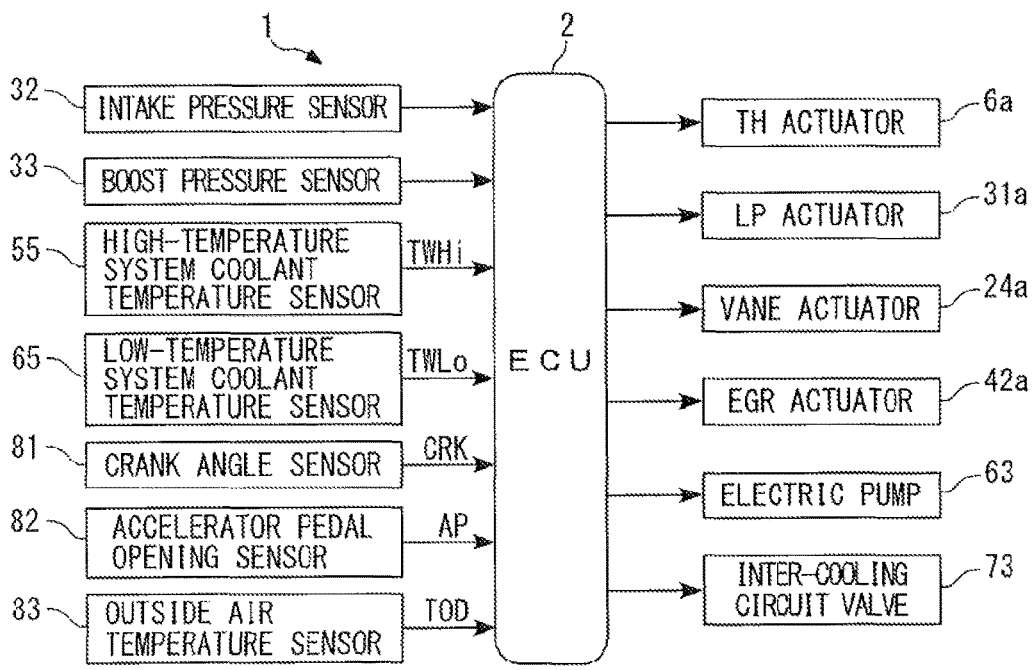
FIG. 2 A schematic block diagram of the cooling control system.

The invention will now be described in detail with reference to drawings showing preferred embodiments thereof. FIG. 1 schematically shows an internal combustion engine (hereinafter referred as "the engine") 3 to which is applied a cooling control system 1 according to an embodiment of the present invention. FIG. 2 schematically shows the cooling control system 1. As shown in FIG. 1, the engine 3 is a gasoline engine that has four cylinders 3a, and is installed on a vehicle (not shown), as a motive power source. Further, the engine 3 includes a turbocharger 11 (supercharger), an EGR device 12, a cooling system 13, and so forth.

The turbocharger 11 is comprised of a compressor 21 disposed in an intake passage 4, a turbine 23 disposed in an exhaust passage 5 for being rotated via a shaft 22 in unison with the compressor 21, a plurality of variable vanes 24, and a vane actuator 24a for actuating the variable vanes 24. In the turbocharger 11, when the turbine 23 is driven for rotation by exhaust gases flowing though the exhaust passage 5, the compressor 21 integrally formed therewith simultaneously rotates, whereby a supercharging operation is performed in which the turbocharger 11 delivers intake gases toward an engine main unit 3b while pressurizing the cases.

The variable vanes 24 are rotatably attached to a wall portion of a housing (not shown) that houses the turbine 23, and are mechanically connected to the vane actuator 24a. An opening of each variable vane 24 is controlled by an ECU 2, described hereinafter, via the vane actuator 24a. With this control, the amount of exhaust gases blown to the turbine 23 is changed, and accordingly the rotational speeds of the turbine 23 and the compressor 21 are changed, whereby the boost pressure is controlled.

In the intake passage 4, there are provided an LP intake throttle valve 31, an intake pressure sensor 32, the above-mentioned compressor 21, a boost pressure sensor 33, an intercooler 34, and a throttle valve 6, from upstream in the mentioned order. The LP intake throttle valve 31 is controlled by an LP actuator 31a according to a control input from the ECU 2, whereby a weak negative pressure is generated near a portion of the intake passage 4 connected to an EGR passage 41, described hereinafter, in order to stably introduce EGR gases into the intake passage 4. The intake pressure sensor 32 detects pressure within the intake passage 4 on the upstream side of the compressor 21, as an intake pressure, and delivers a signal indicative of the detected intake pressure to the ECU 2. The boost pressure sensor 33 detects pressure within the intake passage 4 at a location immediately downstream of the compressor 21, as a boost pressure, and delivers a signal indicative of the detected boost pressure to the ECU 2.

The intercooler 34 cools the intake gases pressurized by the compressor 21 of the turbocharger 11 by heat exchange with engine coolant.

The throttle valve 6 is disposed in the intake passage 4 at a location upstream of an intake manifold 4a, such that it is pivotally movable within the intake passage 4. The degree of opening of the throttle valve 6 is controlled by a TH actuator 6a according to a control input from the ECU 2, whereby the amount of intake gases passing through the throttle valve 6 is controlled.

A catalyst 7 is provided in the exhaust passage 5 at a location downstream of the turbine 23. The catalyst 7 is implemented e.g. by a three-way catalyst, and purifies exhaust gases by oxidizing HC and CO and reducing NOx in the exhaust gases flowing through the exhaust passage 5.

The EGR device 12 performs an EGR operation for recirculating part of exhaust gases discharged into the exhaust passage 5 to the intake passage 4, as EGR gases, and is comprised of the EGR passage 41, an EGR valve 42 and an EGR cooler 43. The EGR passage 41 is provided to connect between a portion of the intake passage 4 at a location upstream of the compressor 21, and a portion of the exhaust passage 5 at a location downstream of the catalyst 7.

The EGR valve 42 is a butterfly type, and is connected to an EGR actuator 42a formed e.g. by a DC motor. The degree of opening of the EGR valve 42 is controlled by the EGR actuator 42a according to a control input from the ECU 2, whereby the amount of EGR gases recirculated from the exhaust passage 5 into the intake passage 4 is controlled.

The EGR cooler 43 is disposed in the EGR passage 41 at a location upstream of the EGR valve 42 (on a side toward the exhaust passage 5), and cools high-temperature EGR gases flowing thorough the EGR passage 41 using engine coolant in an engine cooling circuit 50, described hereinafter, of the cooling system 13.

Figure 3:
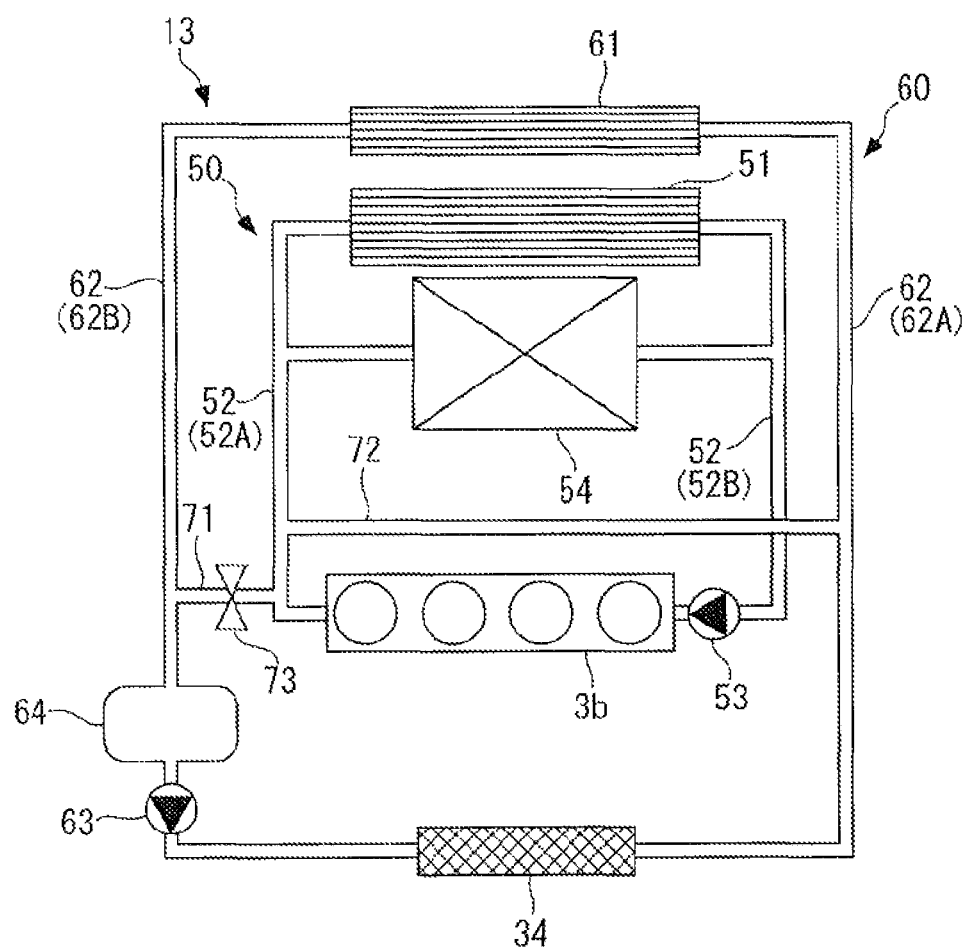
FIG. 3 A schematic diagram of an engine cooling circuit and an intercooler cooling circuit.

As shown in FIGS. 1 and 3, the cooling system 13 includes the engine cooling circuit 50 (engine cooling circuit) for mainly cooling the engine main unit 3b, and an intercooler cooling circuit 60 for mainly cooling the intercooler 34.

The engine cooling circuit 50 includes the engine main unit 3b, a main radiator 51 (first radiator), an engine coolant passage 52 (first coolant passage) for connecting between the engine main unit 3b and the main radiator 51 and also causing relatively high-temperature coolant (hereinafter referred to as the "high-temperature system coolant") to circulate therebetween, and a pump of a mechanical type (first pump, hereinafter referred to as the "mechanical pump") 53 driven by the engine main unit 3b. Further, the engine cooling circuit 50 is configured to cool various types of accessories 54 (see FIG. 3), such as the above-described turbocharger 11 and EGR cooler 43, and further a throttle body, not shown, in addition to the engine main unit 3b. Furthermore, the engine cooling circuit 50 is provided with a coolant temperature sensor (hereinafter referred to as the "high-temperature system coolant temperature sensor") 55 for detecting a temperature of high-temperature system coolant flowing through the engine main unit 3b (hereinafter referred to as the "high-temperature system coolant temperature) TWHi.

In the engine cooling circuit 50 configured as described above, the mechanical pump 53 is operated, whereby the high-temperature system coolant circulates such that it flows clockwise, as viewed in FIG. 3. Note that in the following description, in a case where two coolant passages of the engine coolant passage 52 connecting the engine main unit 3b and the main radiator 51 are distinguished from each other, the coolant passage through which the high-temperature system coolant flows from the engine main unit 3b to the main radiator 51 is denoted by reference numeral "52A", and the coolant passage through which the high-temperature system coolant flows from the main radiator 51 to the engine main unit 3b is denoted by reference numeral "52B".

On the other hand, the intercooler cooling circuit 60 includes the above-mentioned intercooler 34, a sub radiator 61 (second radiator), an intercooler coolant passage 62 (second coolant passage) for connecting between the intercooler 34 and the sub radiator 61 and also causing relatively low-temperature coolant (hereinafter referred to as the "low-temperature system coolant") to circulate therebetween, and a pump of an electric type (second pump, hereinafter referred to as the "electric pump") 63. Further, a chamber 64, which has a transverse cross section larger than that of the intercooler coolant passage 62, is disposed in the intercooler coolant passage 62 at a location upstream of and close to the electric pump 63. Furthermore, the intercooler cooling circuit 60 is provided with a coolant temperature sensor (hereinafter referred to as the "low-temperature system coolant temperature sensor") 65 for detecting a temperature of low-temperature system coolant within the chamber 64 or between the chamber 64 and the intercooler 34 (hereinafter referred to as the "low-temperature system coolant temperature") TWLo.

In the intercooler cooling circuit 60 configured as described above, the electric pump 63 is operated, whereby the low-temperature system coolant circulates such that it flows counterclockwise, as viewed in FIG. 3. Note that in the following description, in a case where two coolant passages of the intercooler coolant passage 62 connecting between the intercooler 34 and the sub radiator 61 are distinguished from each other, the coolant passage through which the low-temperature system coolant flows from the intercooler 34 to the sub radiator 61 is denoted by reference numeral "62A", and the coolant passage through which the low-temperature system coolant flows from the sub radiator 61 to the intercooler 34 is denoted by reference numeral "62B".

Further, in the engine cooling circuit 50 and the intercooler cooling circuit 60, described above, the engine coolant passage 52 and the intercooler coolant passage 62 are connected to each other at respective two locations thereof.

Specifically, a coolant inflow passage 71 for causing the high-temperature system coolant in the engine cooling circuit 50 to flow into the intercooler cooling circuit 60 is connected between downstream of the mechanical pump 53 and the engine main unit 3b and also upstream of the main radiator 51 of the engine cooling circuit 50, and downstream of the sub radiator 61 and also upstream of the electric pump 63 and the chamber 64 of the intercooler cooling circuit 60. Further, the coolant inflow passage 71 is provided with an inter-cooling circuit valve 73 (valve) for opening and closing the coolant inflow passage 71. The valve 73 is configured to be capable of taking only two states, i.e. a fully-open state and a fully-closed state, and is controlled to one of the fully-open state and the fully-closed state, using an ON/OFF control signal from the ECU 2.

Further, a coolant outflow passage 72 for causing the low-temperature system coolant in the intercooler cooling circuit 60 to flow out into the engine cooling circuit 50 is connected between downstream of the electric pump 63 and the intercooler 34 and also upstream of the sub radiator 61 of the intercooler cooling circuit 60, and downstream of the mechanical pump 53 and the engine main unit 3b and also upstream of the main radiator 51 of the engine cooling circuit 50.

Figure 4:
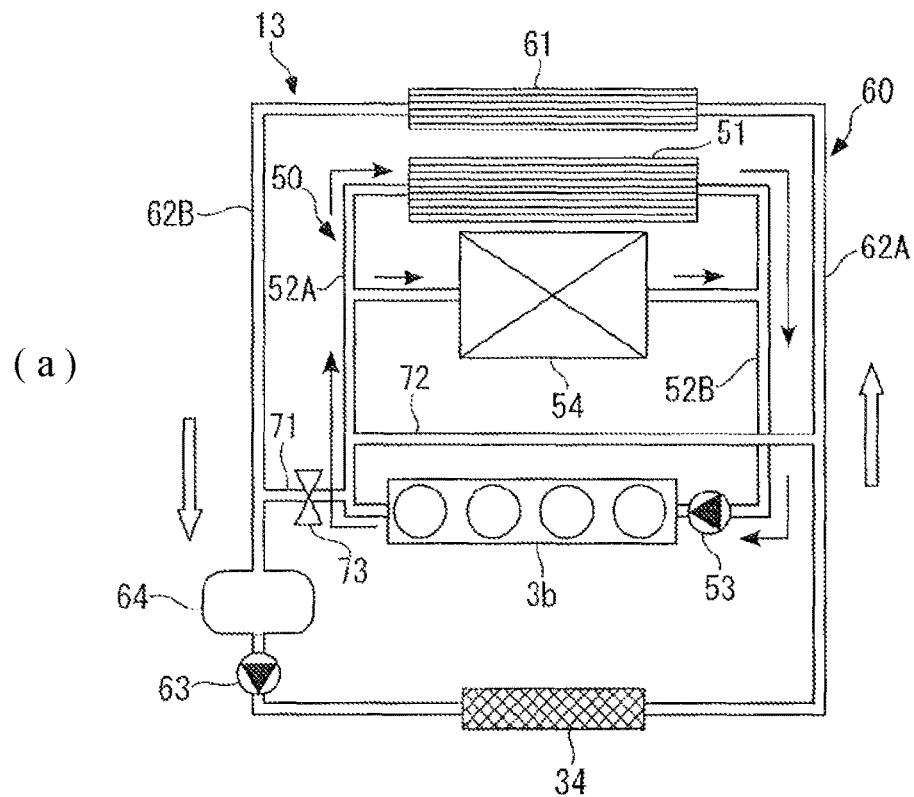
Figure 4:
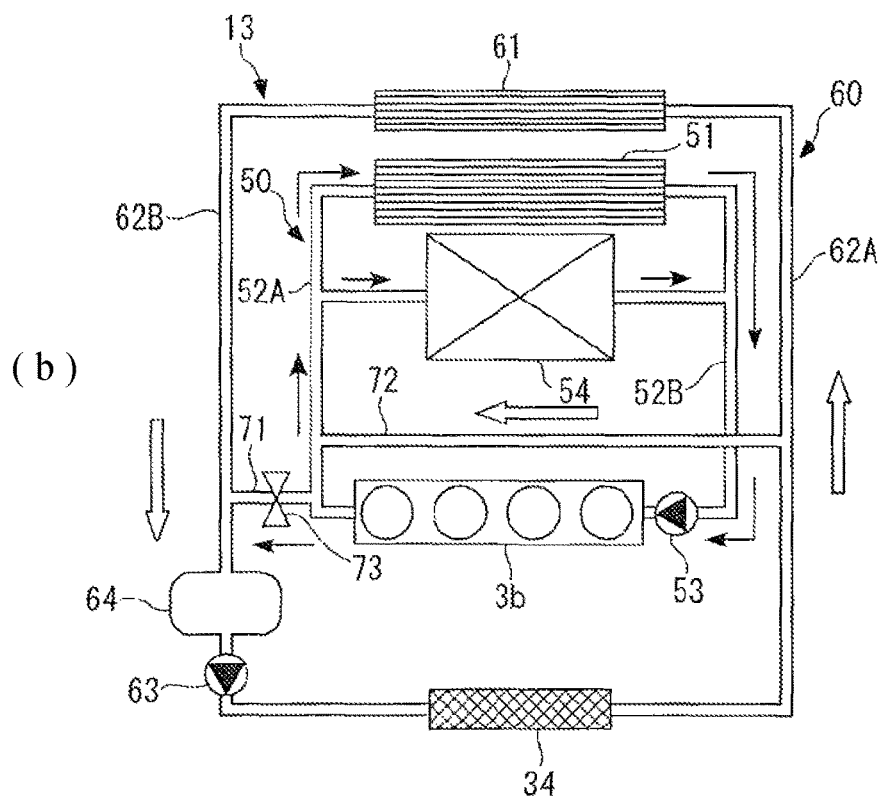

In the cooling system 13 including the engine cooling circuit 50 and the intercooler cooling circuit 60 configured as described above, the coolant in both of the cooling circuits 50 and 60 flows as indicated by arrows in FIG. 4 according to the open/closed state of the inter-cooling circuit valve 73. That is, when the inter-cooling circuit valve 73 is in the fully-closed state, as shown in FIG. 4(a), the high-temperature system coolant circulates through the engine cooling circuit 50 such that it flows clockwise, as indicated by the arrows, and the low-temperature system coolant circulates through the intercooler cooling circuit 60 such that it flows counterclockwise, as indicated by hollow arrows.

On the other hand, when the inter-cooling circuit valve 73 is in the fully-open state, as shown in FIG. 4(b), in addition to the above-described flows of the coolant in the fully-closed state, part of the high-temperature system coolant within the engine cooling circuit 50 flows into the upstream side of the intercooler 34 of the intercooler cooling circuit 60 via the coolant inflow passage 71, and part of the low-temperature system coolant in the intercooler cooling circuit 60 flows out into the downstream side of the engine main unit 3b of the engine cooling circuit 50 via the coolant outflow passage 72. In this case, since the high-temperature system coolant is mixed into the low-temperature system coolant, the temperature of the coolant circulating through the intercooler cooling circuit 60, that is, the temperature of the low-temperature system coolant becomes higher.

Further, the engine 3 is provided with a crank angle sensor 81 (see FIG. 2). The crank angle sensor 81 delivers a CRK signal, which is a pulse signal, to the ECU 2 along with rotation of a crankshaft (not shown), whenever the crankshaft rotates through a predetermined crank angle (e.g. 30°). The ECU 2 calculates a rotational speed of the engine 3 (hereinafter referred to as the "engine speed") NE based on the CRK signal. Further, a detection signal indicative of a stepped-on amount (hereinafter referred to as "accelerator pedal opening") AP of an accelerator pedal (not shown) of the vehicle is output from an accelerator pedal opening sensor 82 to the ECU 2. Furthermore, a detection signal indicative of an outside air temperature TOD around the vehicle is output from an outside air temperature sensor 83 to the ECU 2.

The ECU 2 is implemented by a microcomputer comprised of a CPU, a RAM, a ROM, and an I/O interface (none of which are shown). The ECU 2 determines operating states of the engine 3 according to the detection signals from the aforementioned sensors and the like, and performs the operation control of the electric pump 63 and the opening and closing control of the inter-cooling circuit valve 73 according to the determined operating conditions.

Figure 5:
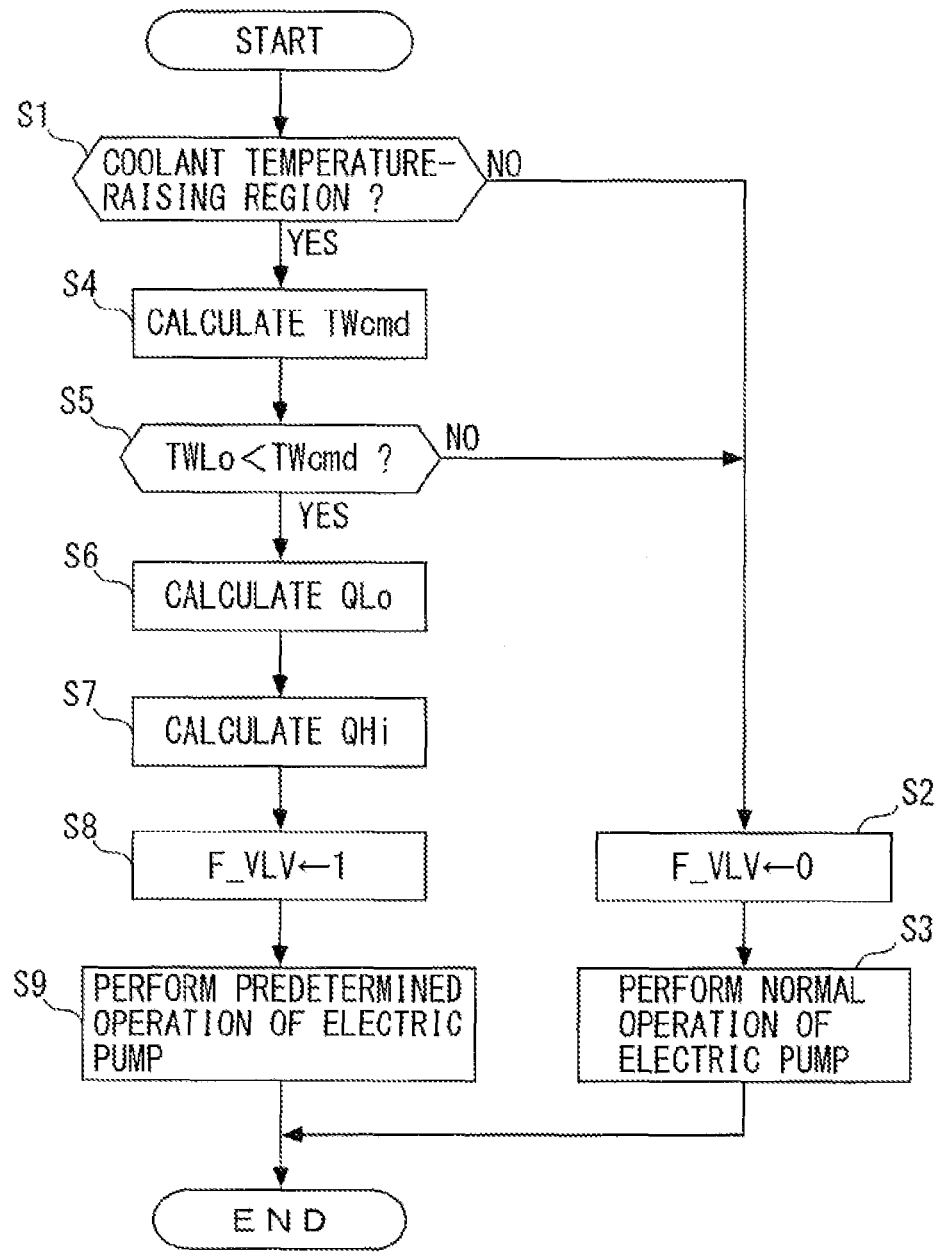
FIG. 5 A flowchart of an operation control process of an electric pump and an opening and closing control process of an inter-cooling circuit valve.

FIG. 5 shows an operation control process of the electric pump 63 and an opening and closing control process of the inter-cooling circuit valve 73, which are executed by the ECU 2. The present control processed are executed at a predetermined repetition period.

In the present process, first, in a step 1 (shown as S1; the following steps are shown in the same way), it is determined whether or not the engine 3 is in a coolant temperature-raising region which is an operating region in which the temperature of the low-temperature system coolant flowing through the intercooler 34 should be raised.

Figure 6:
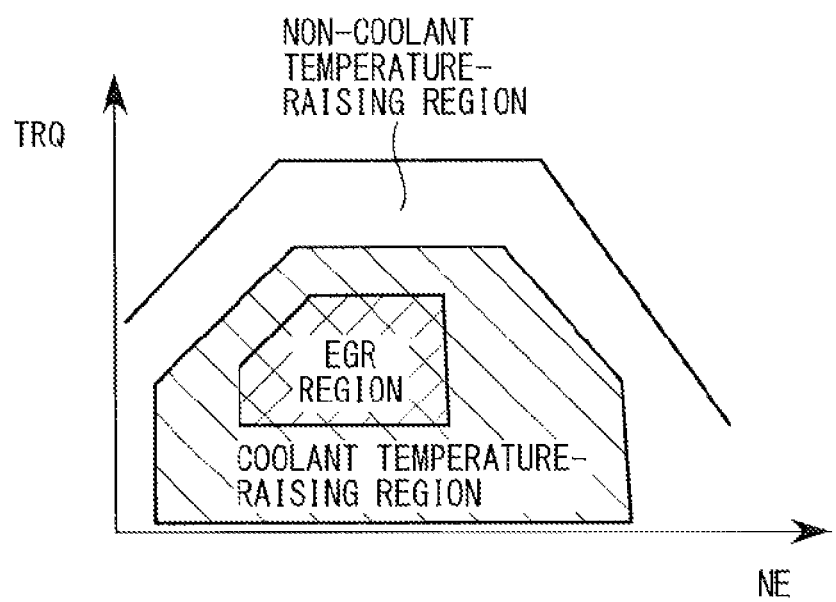
FIG. 6 A map for use in determining a raising region of the temperature of coolant in the intercooler cooling circuit according to an operating state of the engine.

FIG. 6 shows a map for use in determining operating regions of the engine 3, more specifically, an EGR region where EGR should be executed, the above-described coolant temperature-raising region, and a non-coolant temperature-raising region where the low-temperature system coolant temperature should not be raised, in association with operating states of the engine 3. In this map, the operating regions of the engine 3 are set according to the engine speed NE and a demanded torque TRQ based on the engine speed NE and the accelerator pedal opening AP. Note that as shown in FIG. 6, the EGR region is included in the coolant temperature-raising region, and therefore it is determined that during execution of the EGR, the engine 3 is in the coolant temperature-raising region.

If the answer to the question of the step 1 is negative (NO), i.e. if the engine 3 is in the non-coolant temperature-raising region, to maintain or lower the low-temperature system coolant temperature in the intercooler cooling circuit 60, a valve open flag F_VLV is set to 0 (step 2), and normal operation of the electric pump 63 is performed (step 3), followed by terminating the present process. By setting the above-mentioned valve open flag F_VLV to 0, the inter-cooling circuit valve 73 is controlled to the fully-closed state, or when the inter-cooling circuit valve 73 is already in the fully-closed state, the inter-cooling circuit valve 73 is held in this state. Further, in the normal operation of the electric pump 63 in the step 3, the electric pump 63 is continuously operated to deliver a predetermined discharge amount of the low-temperature system coolant, thereby causing the same to circulate through the intercooler cooling circuit 60.

Figure 7:
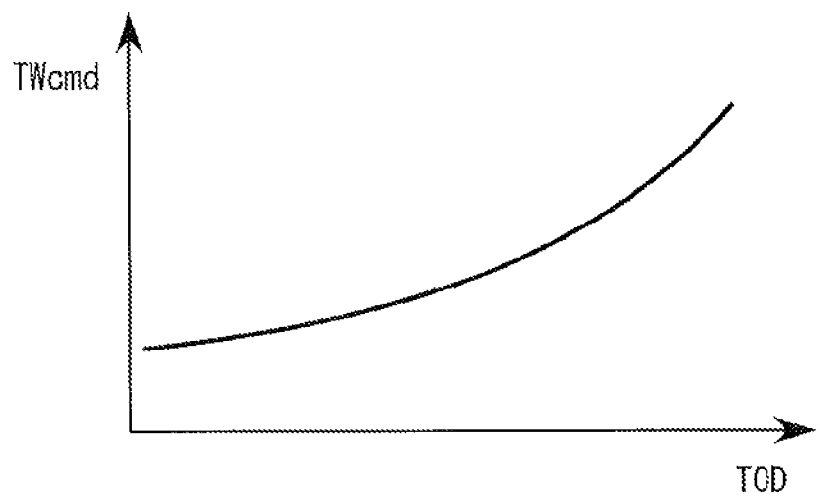
FIG. 7 A map for calculating a target coolant temperature TWcmd.

On the other hand, if the answer to the question of the step 1 is affirmative (YES), i.e. if the engine 3 is in the coolant temperature-raising region, a target coolant temperature TWcmd, which is a target value of the low-temperature system coolant temperature, is calculated (step 4). The target coolant temperature TWcmd is calculated by searching a map shown in FIG. 7 according to the outside air temperature TOD. This map is based on the relationship between the temperature (outside air temperature) and the dew-point, and is set such that the target coolant temperature TWcmd becomes higher as the outside air temperature TOD is higher.

Then, it is determined whether or not the target coolant temperature TWcmd calculated in the step 4 is higher than the low-temperature system coolant temperature TWLo detected by the low-temperature system coolant temperature sensor 65 (step 5). If the answer to this question is negative (NO), i.e. if TWLo≥TWcmd holds, since the low-temperature system coolant temperature TWLo is already high enough, it is determined unnecessary to raise the coolant temperature, so that the steps 2 and 3 are executed, followed by terminating the present process.

Figure 8:
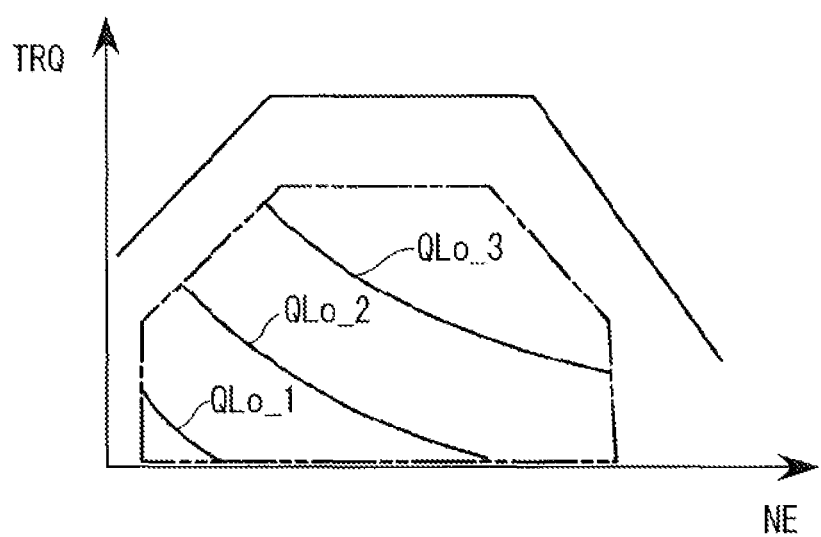
FIG. 8 A map for calculating a lower-limit delivery amount of coolant to be delivered by the electric pump.

On the other hand, if the answer to the question of the step 5 is affirmative (YES), a lower-limit delivery amount QLo of the low-temperature system coolant to be delivered by the electric pump 63 is calculated (step 6). The lower-limit delivery amount QLo is a minimum delivery amount with which occurrence of knocking in the engine 3 can be suppressed, and is calculated by searching a nap shown in FIG. 8 according to the engine speed NE and the demanded torque TRQ. In this map, three predetermined delivery amounts QLo_1, QLo_2, and QLo_3 per predetermined unit time are set in the above-described coolant temperature-raising region in FIG. 6 (region indicated by two-dot chain lines in FIG. 8). The three delivery amounts have a magnitude relationship of QLo_1<QLo_2< and QLo_3, and are set such that the delivery amount becomes larger as the engine speed NE and the demanded torque TRQ are larger. Note that when the value of the lower-limit delivery amount QLo based on the engine speed NE and the demanded torque TRQ is not equal to any one of the three delivery amounts, the lower-limit delivery amount QLo is calculated by interpolation.

Then, an inflow amount QHi of the high-temperature system coolant flowing from the engine cooling circuit 50 into the intercooler cooling circuit 60 is calculated (step 7). The inflow amount QHi is calculated using the target coolant temperature TWcmd calculated in the step 4, the lower-limit delivery amount QLo calculated in the step 6, the high-temperature system coolant temperature TWHi detected by the high-temperature system coolant temperature sensor 55, and the low-temperature system coolant temperature TWLo detected by the low-temperature system coolant temperature sensor 65 by the following equation (1):

$$QHi = \frac{TWcmd - TWLo}{TWHi - TWcmd} QLo \qquad (1)$$

Next, the valve open flag F_VLV is set to 1 (step 8), and a predetermined operation of the electric pump 53 is performed (step 9), followed by terminating the present process. By setting the above-mentioned valve open flag F_VLV to 1, the inter-cooling circuit valve 73 is controlled to the fully-open state, or when the inter-cooling circuit valve 73 is already in the fully-open state, the inter-cooling circuit valve 73 is held in this state.

Further, in the predetermined operation of the electric pump 63 in the step 9, the electric pump 63 is continuously operated to deliver the low-temperature system coolant according to the inflow amount QHi of the high-temperature system coolant calculated in the step 7. This causes part of the high-temperature system coolant in the engine cooling circuit 50 to flow into the intercooler cooling circuit 60 via the coolant inflow passage 71, and causes part of the low-temperature system coolant in the intercooler cooling circuit 60 to flow out into the engine cooling circuit 50 via the coolant outflow passage 72. Therefore, in the intercooler cooling circuit 60, the high-temperature system coolant is mixed into the low-temperature system coolant, whereby the low-temperature system coolant temperature is raised. As a consequence, condensed water is prevented from being generated when intake gases pass through the intercooler 34 of the intake passage 4.

Figure 9:
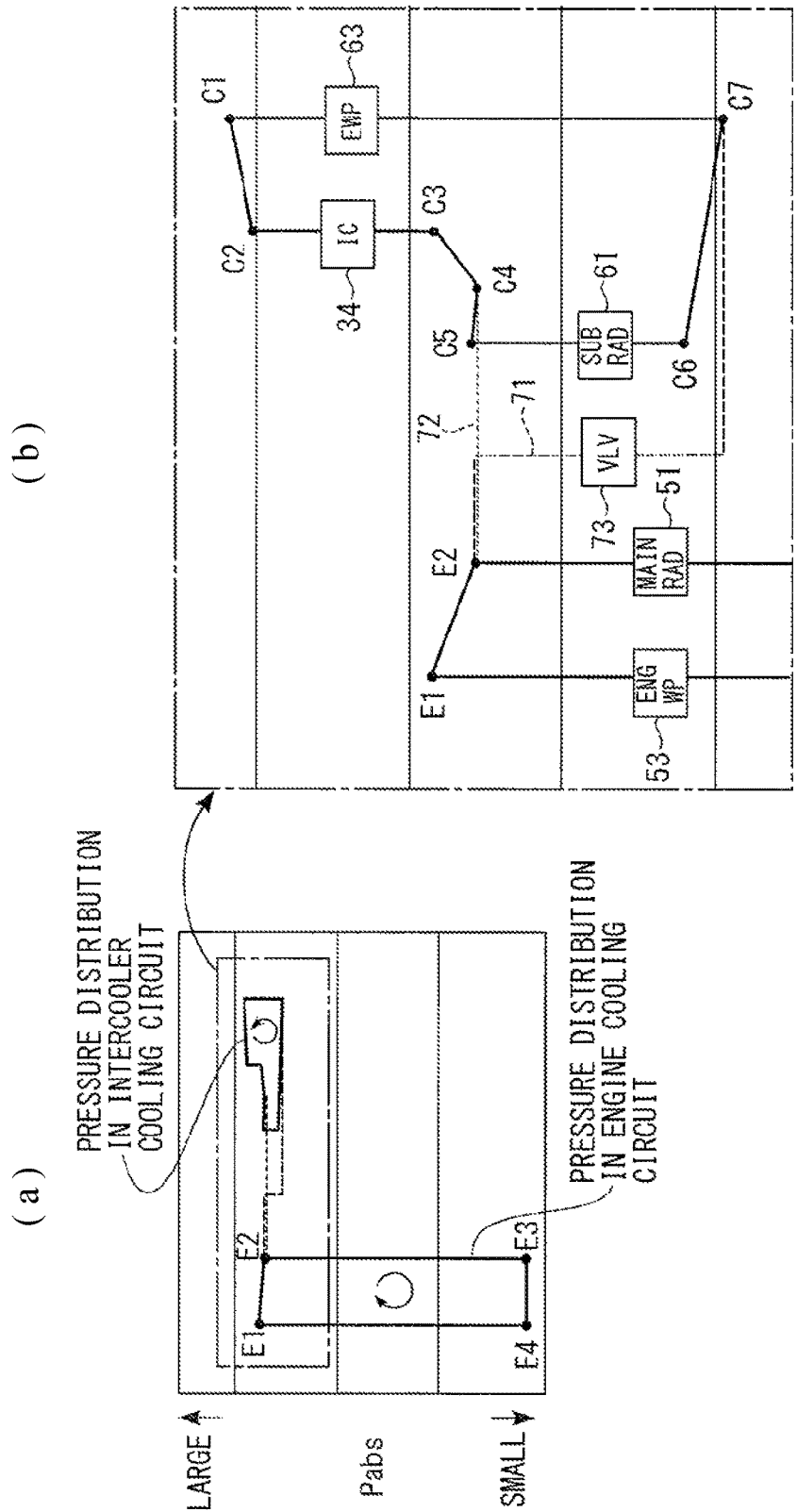
Figure 10:
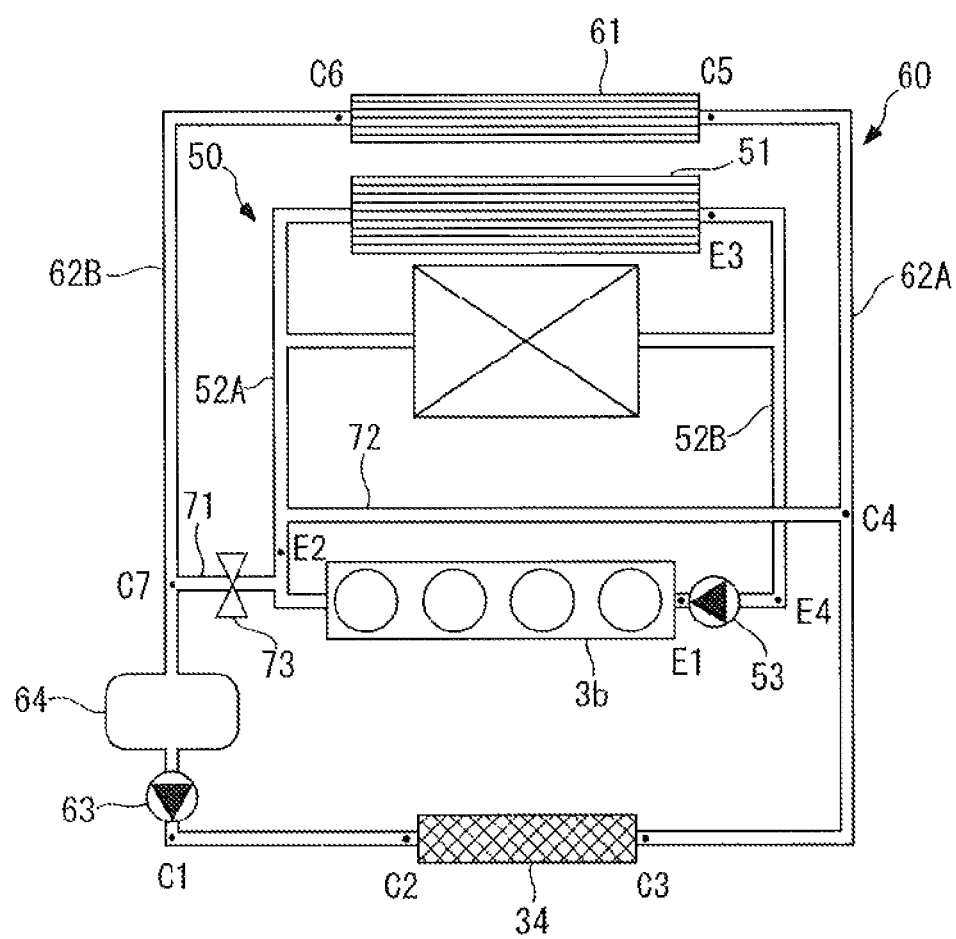
FIG. 10 A diagram in which points (E1 to E4) in the engine cooling circuit and points (C1 to C7) in the intercooler cooling circuit in the pressure distribution in FIG. 9 are added to the FIG. 3 cooling circuit diagram.

Here, a pressure distribution of the coolant in the engine cooling circuit 50 and the intercooler cooling circuit 60 will be described with reference to FIGS. 9 and 10. FIG. 9(*a*) shows the entirety of the absolute pressure distribution of the coolant in the two cooling circuits 50 and 60, and FIG. 9(*b*) shows a portion of FIG. 9(*a*) encircled by a one-dot chain line, which is illustrated in a state vertically scaled up by a predetermined scaling factor (of e.g. 10). Note that in FIG. 9(*b*), the main radiator 51 and the mechanical pump 53 of the engine cooling circuit 50 are denoted by "MAIN RAD" and "ENG WP", respectively, the sub radiator 61, the electric pump 63, and the intercooler 34 of the intercooler cooling circuit 60 are denoted by "SUB RAD", "EWP", and "IC", respectively, and the inter-cooling circuit valve 73 is denoted by "VLV", for convenience.

As shown in FIG. 9, in the engine cooling circuit 50, the high-temperature system coolant is pressurized by being delivered by the mechanical pump 53, whereafter the high-temperature system coolant is depressurized due to pressure loss caused by passing of the coolant through the main radiator 51. Therefore, in the engine cooling circuit 50, the high-temperature system coolant circulates such that it flows to pass the points E1, E2, E3, and E4 in the mentioned order (clockwise, as viewed in FIG. 9). Further, the pressure of the coolant is very high at the points E1 and E2, whereas it is very low at the points E3 and E4. Note that a pressure difference between the points E1 and E2 and the points E3 and E4 is e.g. approximately 50 kPa.

On the other hand, in the intercooler cooling circuit 60, the low-temperature system coolant is pressurized by being delivered by the electric pump 63, whereafter the low-temperature system coolant is depressurized due to pressure loss caused by passing of the coolant through the intercooler 34 and the sub radiator 61. Therefore, in the intercooler cooling circuit 60, the low-temperature system coolant circulates such that it flows to pass the points C1, C2, C3, C4, C5, C6, and C7 in the mentioned order (counterclockwise, as viewed in FIG. 9). Further, in this case, compared with pressure at the points E1 and E2 of the engine cooling circuit 50, pressure at the points C1 and C2 of the intercooler cooling circuit 60 is higher to some degree, pressure at the points C3, C4, and C5 of the intercooler cooling circuit 60 is approximately equal, and pressure at the points C6 and C7 of the intercooler cooling circuit 60 is lower to some degree. Note that a pressure difference between the points C1 and C2 and the points C6 and C7 is e.g. approximately 6 kPa.

In the engine cooling circuit 50 and the intercooler cooling circuit 60 having the coolant pressure distribution as described above, when the inter-cooling circuit valve 73 is controlled to the fully-open state, the high-temperature system coolant within the engine cooling circuit 50 flows into the intercooler cooling circuit 60 via the coolant inflow passage 71, and the low-temperature system coolant in the intercooler cooling circuit 60 flows out into the engine cooling circuit 50 via the coolant outflow passage 72.

In this case, although there is some degree of pressure difference (e.g. approximately 3 kPa) between pressure at an outflow position (the point E2) of the engine cooling circuit 50 from which the high-temperature system coolant flows out and pressure at an inflow position (the point C7) of the intercooler cooling circuit 60 into which the high-temperature system coolant flows, pressure at an outflow position (the point C4) of the intercooler cooling circuit 60 from which the low-temperature system coolant flows out and pressure at an inflow position (the point E2) of the engine cooling circuit 50 into which the low-temperature system coolant flows are approximately equal to each other, and there is almost no pressure difference therebetween.

As described in detail hereinabove, according to the present embodiment, by causing the low-temperature system coolant to circulate through the intercooler cooling circuit 60, it is possible to properly cool intake gases which have been increased in temperature by being pressurized by the turbocharger 11. Further, by opening the inter-cooling circuit valve 73, part of the high-temperature system coolant circulating through the engine cooling circuit 50 flows into the intercooler cooling circuit 60 via the coolant inflow passage 71, and part of the low-temperature system coolant circulating through the intercooler cooling circuit 60 flows out into the engine cooling circuit 50 via the coolant outflow passage 72. With this, the high-temperature system coolant from the engine cooling circuit 50 is mixed into the low-temperature system coolant in the intercooler cooling circuit 60, so that it is possible to raise the temperature of the low-temperature system coolant, whereby it is possible to prevent intake gases cooled by the intercooler 34 from being excessively cooled, thereby making it possible to suppress generation of condensed water.

Further, the engine cooling circuit 50 and the intercooler cooling circuit 60 are connected at the above-mentioned predetermined positions via the coolant inflow passage 71 and the coolant outflow passage 72, whereby in the engine cooling circuit 50, a position where the high-temperature system coolant flows out into the intercooler cooling circuit 60 and a position where the low-temperature system coolant flows in from the intercooler cooling circuit 60 are both commonly located downstream of the mechanical pump 53 and also upstream of the main radiator 51. For this reason, in a case where the coolant is caused to flow between the engine cooling circuit 50 and the intercooler cooling circuit 60, it is possible to make the pressure difference in the flowing coolant much smaller than the prior art. As described heretofore, the pressure difference in the coolant flowing between the engine cooling circuit 50 and the intercooler cooling circuit 60 can be suppressed, and hence even if the degree of opening of the inter-cooling circuit valve 73 provided in the coolant inflow passage 71 is increased, it is possible to cause the coolant to properly flow from one to the other of the cooling circuits 50 and 60.

Furthermore, a relatively simple and inexpensive valve which is opened and closed by the ON/OFF control signal from the ECU 2 is employed as the inter-cooling circuit valve 73, and hence, compared with the case where a valve of which the degree of opening can be finely controlled is employed, it is possible to reduce the manufacturing costs of the cooling control system 1. Further, by accurately detecting the low-temperature system coolant temperature TWLo immediately before the low-temperature system coolant flows into the intercooler 34, using the low-temperature system coolant temperature sensor 65, it is possible to properly control e.g. the opening and closing of the inter-cooling circuit valve 73 according to a result of the detection.

Further, in the intercooler coolant passage 62B, the chamber 64 is provided at a location downstream of a portion of the same connected to the coolant inflow passage 71 and also upstream of the intercooler 34, and hence even when the high-temperature system coolant in the engine cooling circuit 50 flows into the intercooler cooling circuit 60 or when the inflow thereof is stopped, along with opening or closing of the inter-cooling circuit valve 73, it is possible to suppress hunting of a change in the temperature of the low-temperature system coolant flowing into the intercooler 34. With this, in a case where e.g. the opening and closing of the inter-cooling circuit valve 73 is controlled according to the temperature of the low-temperature system coolant flowing into the intercooler 34, it is possible to properly and stably perform the control.

Figure 11:
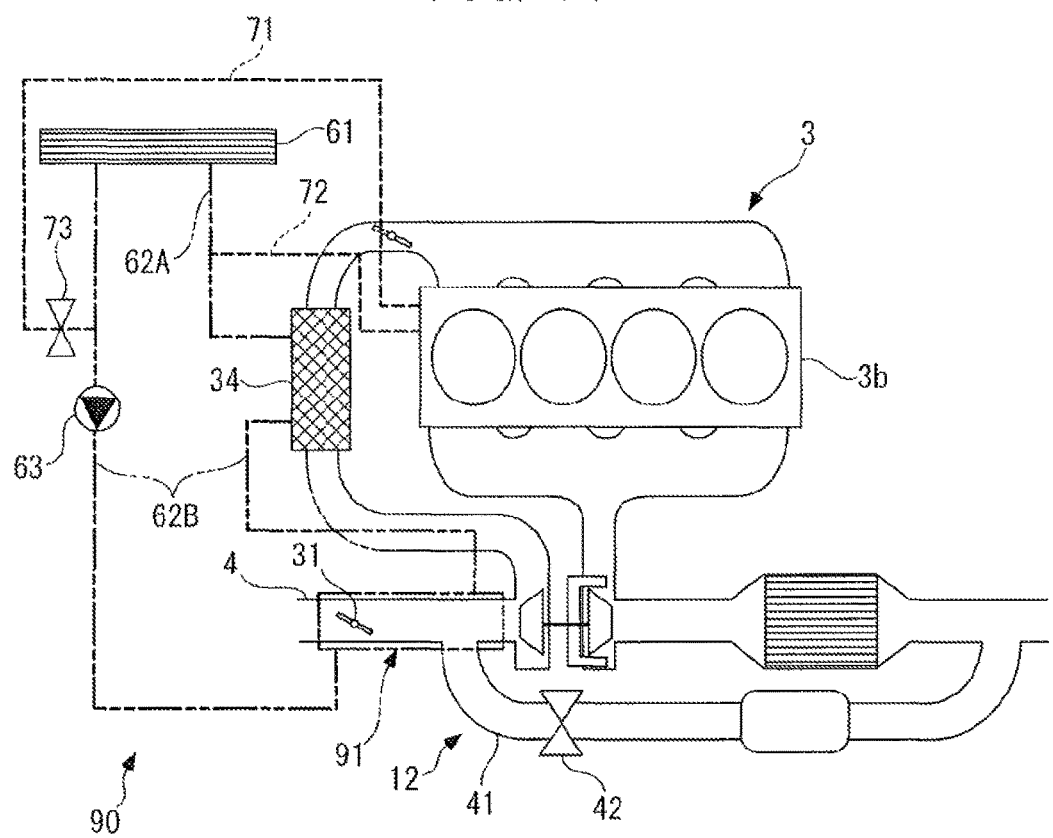
FIG. 11 A diagram of a variation of the intercooler cooling circuit.

FIG. 11 schematically shows the engine 3 to which is applied a variation of the above-described intercooler cooling circuit 60. Note that in the following description, the same components of an intercooler cooling circuit 90 of the variation as those of the intercooler cooling circuit 60 are denoted by the same reference numerals, and only different points from the intercooler cooling circuit 60 will be described.

As shown in FIG. 11, the intercooler cooling circuit 90 includes, between the electric pump 63 and the intercooler 34, an intake passage heating portion 91 for causing coolant in the intercooler cooling circuit 90 to flow through a surrounding of the connecting portion of the intake passage 4 to the EGR passage 41 (hereinafter referred to as the "EGR introduction portion"), to thereby heat the EGR introduction portion.

Figure 12:
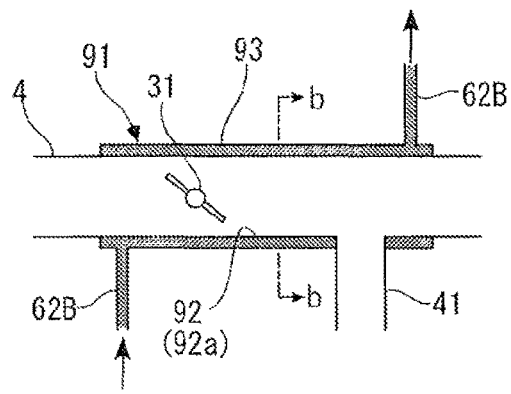
FIG. 12(a) is a diagram of an area surrounding a connecting portion of an intake passage to an EGR passage, appearing in FIG. 11.
FIG. 12(b) is a cross-sectional view taken on line b-b of FIG. 12(a).
Figure 12:
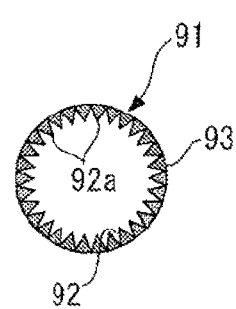

FIG. 12(a) shows the EGR introduction portion on an enlarged scale. As shown in the figure, the intake passage heating portion 91 provided in the EGR introduction portion includes a hollow cylindrical inner wall 92 concentrically extending with the intake passage 4, and a hollow cylindrical outer wall 93 formed outside the inner wall 92 with a space therebetween. As shown in FIG. 12(b), the inner wall 92 is provided with a large number of fins 92a arranged along a circumferential direction and protruding toward the inside of the intake passage 4. On the other hand, the outer wall 93 has the intercooler coolant passage 62B of the intercooler cooling circuit 90 connected thereto. This makes it possible for the coolant of the coolant intercooler cooling circuit 90 to flow between the inner wall 92 and the outer wall 93 of the intake passage heating portion 91.

In the intercooler cooling circuit 90 including the intake passage heating portion 91 constructed as described above, by causing the coolant to flow through the intake passage heating portion 91, it is possible to heat the inner wall 92 of the intake passage heating portion 91. With this, the EGR introduction portion of the intake passage 4 is heated, whereby it is possible to prevent condensed water from being generated by passing of the EGR gases through the EGR introduction portion. Particularly even in a case where the outside air temperature is low (e.g. not higher than 10° C.), it is possible to execute the EGR while preventing condensed water from being generated by EGR gases in the EGR introduction portion, which makes it possible to improve fuel economy of the engine 3. Further, by providing the large number of fins 92a on the inner wall 92 of the intake passage heating portion 91, a contact area of the inner wall 92 with EGR gases is increased, and hence it is possible to efficiently heat the inner wall 92, thereby making it possible to more effectively suppress generation of condensed water in the EGR introduction portion.

Note that the present invention is by no means limited to the above-described embodiment, but can be practiced in various forms. For example, although in the embodiment, the valve capable of taking only two states, i.e. the fully-open state and the fully-closed state is employed as the inter-cooling circuit valve 73 provided in the coolant inflow passage 71, it is also possible to replace the valve by a valve capable of controlling the degree of opening thereof or a temperature sensitive thermostat.

Further, the details of the construction of the cooling control system 1 are described only by way of example, and therefore it can be changed, as desired, within the scope of the subject matter of the present invention.

REFERENCE SIGNS LIST 1 cooling control system 1
2 ECU (valve control means)
3 internal combustion engine
3b engine main unit
4 intake passage
5 exhaust passage
11 turbocharger (supercharger)
12 EGR device
13 cooling device
21 compressor
31 LP intake throttle valve
34 intercooler
41 EGR passage
50 engine cooling circuit (engine cooling circuit)
51 main radiator (first radiator)
52 engine coolant passage (first coolant passage)
52A engine coolant passage (first coolant passage)
52B engine coolant passage (first coolant passage)
53 mechanical pump (first pump)
55 high-temperature system coolant temperature sensor
60 intercooler cooling circuit
61 sub radiator (second radiator)
62 intercooler coolant passage (second coolant passage)
62A intercooler coolant passage (second coolant passage)
62B intercooler coolant passage (second coolant passage)
63 electric pump (second pump)

64 chamber
65 low-temperature system coolant temperature sensor
71 coolant inflow passage
72 coolant outflow passage
73 inter-cooling circuit valve (valve)
83 outside air temperature sensor
90 intercooler cooling circuit
91 intake passage heating portion
92 inner wall of intake passage heating portion
92a fin of inner wall
93 outer wall of intake passage heating portion
NE engine speed
AP accelerator pedal opening
F_VLV valve open flag
TRQ demanded torque
TWcmd target coolant temperature
TOD outside air temperature
TWHi high-temperature system coolant temperature
TWLo low-temperature system coolant temperature
QLo lower-limit delivery amount of low-temperature system coolant delivered by electric pump
QHi inflow amount of high-temperature system coolant flowing from engine cooling circuit into intercooler cooling circuit

The invention claimed is:

1. A cooling control system for an internal combustion engine that includes a supercharger, the cooling control system being provided for cooling intake gases which have been increased in temperature by being pressurized by the supercharger, comprising:
 an engine cooling circuit that includes an engine main unit, a first radiator, a first coolant passage connecting between the engine main unit and the first radiator, for causing coolant to circulate therebetween, and a first pump provided in the first coolant passage, for delivering the coolant to thereby cause the coolant to circulate;
 an intercooler cooling circuit that includes an intercooler for cooling the intake gases, a second radiator, a second coolant passage connecting between the intercooler and the second radiator, for causing coolant to circulate therebetween, and a second pump provided in the second coolant passage, for delivering the coolant to thereby cause the coolant to circulate; and
 a plurality of connection passages connecting the first coolant passage and the second coolant passage, for causing the coolant to flow from one to the other of the engine cooling circuit and the intercooler cooling circuit,
 wherein the plurality of connection passages include:
 a coolant inflow passage that is connected between downstream of the first pump and also upstream of the first radiator of the engine cooling circuit, and downstream of the second radiator and also upstream of the second pump of the intercooler cooling circuit, for causing the coolant in the engine cooling circuit to flow into the intercooler cooling circuit; and
 a coolant outflow passage that is connected between downstream of the second pump and also upstream of the second radiator of the intercooler cooling circuit, and downstream of the first pump and also upstream of the first radiator of the engine cooling circuit, for causing the coolant in the intercooler cooling circuit to flow out into the engine cooling circuit,
 the cooling control system further comprising a valve that is openably and closably provided in the coolant inflow passage, for being opened when the coolant in the engine cooling circuit is caused to flow into the intercooler cooling circuit.

2. The cooling control system according to claim 1, further comprising valve control means for controlling the valve, and
 wherein the valve control means controls the valve to one of a fully-open state and a fully-closed state.

3. The cooling control system according to claim 2, wherein in the second coolant passage of the intercooler cooling circuit, a coolant sensor for detecting a temperature of coolant flowing through the second coolant passage is provided at a location downstream of a connecting portion of the second coolant passage to the coolant inflow passage and also upstream of the intercooler, and
 wherein the valve control means controls the valve according to the temperature of the coolant detected by the coolant sensor.

4. The cooling control system according to claim 1, wherein in the second coolant passage of the intercooler cooling circuit, a chamber having a transverse cross section larger than that of the second coolant passage is provided at a location downstream of a connecting portion of the second coolant passage to the coolant inflow passage and also upstream of the intercooler.

5. The cooling control system according to claim 2, wherein in the second coolant passage of the intercooler cooling circuit, a chamber having a transverse cross section larger than that of the second coolant passage is provided at a location downstream of a connecting portion of the second coolant passage to the coolant inflow passage and also upstream of the intercooler.

6. The cooling control system according to claim 3, wherein in the second coolant passage of the intercooler cooling circuit, a chamber having a transverse cross section larger than that of the second coolant passage is provided at a location downstream of a connecting portion of the second coolant passage to the coolant inflow passage and also upstream of the intercooler.

7. The cooling control system according to claim 1, wherein the engine further includes an EGR device for recirculating part of exhaust gases discharged into an exhaust passage of the engine to an upstream side of a compressor of the supercharger in an intake passage of the engine, via an EGR passage, and
 wherein the intake passage has an intake passage heating portion provided in a surrounding of a connecting portion of the intake passage to the EGR passage, for causing the coolant in the intercooler cooling circuit to flow between an inner wall and an outer wall of the intake passage, to thereby heat the inner wall.

8. The cooling control system according to claim 2, wherein the engine further includes an EGR device for recirculating part of exhaust gases discharged into an exhaust passage of the engine to an upstream side of a compressor of the supercharger in an intake passage of the engine, via an EGR passage, and
 wherein the intake passage has an intake passage heating portion provided in a surrounding of a connecting portion of the intake passage to the EGR passage, for causing the coolant in the intercooler cooling circuit to flow between an inner wall and an outer wall of the intake passage, to thereby heat the inner wall.

9. The cooling control system according to claim 3, wherein the engine further includes an EGR device for recirculating part of exhaust gases discharged into an exhaust passage of the engine to an upstream side of a compressor of the supercharger in an intake passage of the engine, via an EGR passage, and
wherein the intake passage has an intake passage heating portion provided in a surrounding of a connecting portion of the intake passage to the EGR passage, for causing the coolant in the intercooler cooling circuit to flow between an inner wall and an outer wall of the intake passage, to thereby heat the inner wall.

10. The cooling control system according to claim 4, wherein the engine further includes an EGR device for recirculating part of exhaust gases discharged into an exhaust passage of the engine to an upstream side of a compressor of the supercharger in an intake passage of the engine, via an EGR passage, and
wherein the intake passage has an intake passage heating portion provided in a surrounding of a connecting portion of the intake passage to the EGR passage, for causing the coolant in the intercooler cooling circuit to flow between an inner wall and an outer wall of the intake passage, to thereby heat the inner wall.

11. The cooling control system according to claim 5, wherein the engine further includes an EGR device for recirculating part of exhaust gases discharged into an exhaust passage of the engine to an upstream side of a compressor of the supercharger in an intake passage of the engine, via an EGR passage, and
wherein the intake passage has an intake passage heating portion provided in a surrounding of a connecting portion of the intake passage to the EGR passage, for causing the coolant in the intercooler cooling circuit to flow between an inner wall and an outer wall of the intake passage, to thereby heat the inner wall.

12. The cooling control system according to claim 6, wherein the engine further includes an EGR device for recirculating part of exhaust gases discharged into an exhaust passage of the engine to an upstream side of a compressor of the supercharger in an intake passage of the engine, via an EGR passage, and
wherein the intake passage has an intake passage heating portion provided in a surrounding of a connecting portion of the intake passage to the EGR passage, for causing the coolant in the intercooler cooling circuit to flow between an inner wall and an outer wall of the intake passage, to thereby heat the inner wall.

13. The cooling control system according to claim 7, wherein the inner wall is provided with a plurality of fins protruding toward an inside of the intake passage.

14. The cooling control system according to claim 8, wherein the inner wall is provided with a plurality of fins protruding toward an inside of the intake passage.

15. The cooling control system according to claim 9, wherein the inner wall is provided with a plurality of fins protruding toward an inside of the intake passage.

16. The cooling control system according to claim 10, wherein the inner wall is provided with a plurality of fins protruding toward an inside of the intake passage.

17. The cooling control system according to claim 11, wherein the inner wall is provided with a plurality of fins protruding toward an inside of the intake passage.

18. The cooling control system according to claim 12, wherein the inner wall is provided with a plurality of fins protruding toward an inside of the intake passage.

* * * * *